US008280988B1

(12) United States Patent
Parekh et al.

(10) Patent No.: US 8,280,988 B1
(45) Date of Patent: Oct. 2, 2012

(54) CONTENT TRANSFER MANAGEMENT FOR READER DEVICE

(75) Inventors: Jateen P. Parekh, San Francisco, CA (US); Kenneth P. Kiraly, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/240,808

(22) Filed: Sep. 22, 2011

Related U.S. Application Data

(62) Division of application No. 11/693,513, filed on Mar. 29, 2007, now Pat. No. 8,046,435.

(51) Int. Cl.
*G06F 13/00* (2006.01)
(52) U.S. Cl. .......................... 709/219; 709/225; 709/229
(58) Field of Classification Search .................. 709/217, 709/219, 223, 225, 227, 229
See application file for complete search history.

(56) References Cited

U.S. PATENT DOCUMENTS

| | | | |
|---|---|---|---|
| 8,024,762 B2* | 9/2011 | Britt ................................ 725/92 |
| 8,069,204 B2* | 11/2011 | Reisman ....................... 709/203 |
| 2002/0065781 A1 | 5/2002 | Hillegass et al. |
| 2003/0097338 A1 | 5/2003 | Mankovich et al. |
| 2006/0059095 A1 | 3/2006 | Akins, III et al. |
| 2007/0011061 A1* | 1/2007 | East ................................ 705/28 |
| 2007/0299780 A1* | 12/2007 | Vanska et al. ................... 705/59 |
| 2008/0004978 A1 | 1/2008 | Rothschild |
| 2008/0065741 A1 | 3/2008 | Stratton et al. |
| 2008/0065911 A1 | 3/2008 | Elazar et al. |

* cited by examiner

*Primary Examiner* — Viet Vu
(74) *Attorney, Agent, or Firm* — Lee & Hayes, PLLC

(57) ABSTRACT

A technique in which content is supplied to an electronic reader device is described. A time at which to send content to the electronic reader device is stored in a content server based on user preferences, user electronic reader device interaction or network conditions. The content is transmitted to the electronic reader device at the time for later display. Additional content may be securely supplied to the electronic reader device for purchase. The additional content may be in a format such that when a user later enters a request to purchase the content, the content can be instantly displayed.

32 Claims, 12 Drawing Sheets

CONTENT TRANSFER MANAGEMENT FOR READER DEVICE

CROSS-REFERENCE TO RELATED APPLICATION

This patent application is a divisional application of, commonly-owned U.S. application Ser. No. 11/693,513 filed Mar. 29, 2007 now U.S. Pat. No. 8,046,435 entitled "Content Transfer Management for Reader Device", issued on Oct. 25, 2011, and incorporated herein in its entirety by reference.

BACKGROUND

Electronic distribution of digital encoded information has gained in importance with the proliferation of personal computers, and has undergone a tremendous upsurge in popularity as the Internet has become widely available. With the widespread use of the Internet, it has become possible to distribute large, coherent units of information, such as books, using electronic technologies. Books and other printed content distributed using electronic technologies are commonly referred to as electronic books ("eBooks"). Various entities make eBooks available for download over ordinary network connections, such as broadband and dialup connections.

Typical electronic reader devices attempt to mimic the experience of reading a conventional paper book or other printed works through display of electronic information on one or more electronic displays. Digital works are structured as virtual frames presented on a display device, and a user may turn or change from one virtual frame or "page" of electronic content to another. The term "page" as used herein refers to a collection of content that is presented at one time on a display. Thus, "pages" as described herein are not fixed permanently, and may be redefined or repaginated based on variances in display conditions, such as screen size, font type or size, margins, line spacing, resolution, or the like. A typical electronic reader device is a handheld digital device having a liquid crystal display panel, having enough memory and having processing capability to store several eBooks. EBooks may be displayed and read on a variety of different display devices, such as computer monitors, portable digital assistants (PDAs), pocket personal computers (PCs), and specialized eBook reader devices, for example. Such devices are capable of retrieving and displaying an eBook or portion of an eBook such as a page for reading.

There are some advantages to using an electronic reader device over conventional paper books or other printed works. An electronic reader device is often capable of storing a number of complete unabridged works. Therefore, an electronic reader device containing a number of stored printed works weighs significantly less than the same number of printed works. This makes an electronic reader device a particularly attractive alternative to printed works for travel, educational purposes, and professional business use. Also, because electronic reader devices do not require the use of paper products, they are generally offered at a lower price than their printed counterparts. Furthermore, the use of electronic reader devices in conjunction with printed works may be beneficial to the ecosystem, by reducing a number of books produced using paper products.

To date, however, electronic reader devices and the use of electronic reader device in general have not achieved widespread consumer acceptance. This is mainly attributable to the design and implementation particulars of conventional electronic reader devices.

For instance, lack of instant availability of new content may be one reason the use of conventional electronic reader devices has not gained widespread popularity. When a user attempts to obtain content using an electronic reader device, the user may have to wait for the electronic reader device to log onto a network, purchase the new content, download the new content for the electronic reader device and finally launch an application to display the content. Retrieval of content may require time which degrades the electronic reader device user experience.

Another attribute that has limited electronic reader device acceptance are that limitations on power consumption particularly limit and affect the use of an electronic reader device. Internal components of the electronic reader device may require increased energy to facilitate retrieval and transfer of eBook content from a server for subsequent display of the electronic reader device. These operations may often reduce battery life.

Further, the electronic reader device may use wireless networks to retrieve content. The use of bandwidth to retrieve new content may be costly especially during peak hours. Thus the download of eBook content may increase the cost of the content thereby reducing the widespread consumer acceptance of electronic reader devices.

The preceding description of various disadvantages of conventional electronic reader devices was provided herein for contextual reasons only.

SUMMARY

An electronic book ("eBook") reader device and a method for operating an electronic reader device are provided that include enhanced download and purchase management features. These features are designed to reduce time to download digital content, reduce power and costs when either purchasing or obtaining content, and enhance the overall user electronic reader device experience.

In an illustrative embodiment, a time is stored in a memory of a server that indicates when to transmit content to the electronic reader device. The server connects with the electronic reader device, and provides an indication to the reader device to begin receiving content from the server at the time and then begins transmitting the content from the server to the electronic reader device for storage and later display. The time to download content may be during a time period of network low bandwidth use or a strong network signal to reduce the time and thus the power required during the download. In yet another embodiment, the content may be downloaded during a time period of when the cost to transmit information over the network is reduced and thus reduce the total content delivery cost.

In another illustrative embodiment, user preferences are stored in a server. The server uses the preferences to send renderable and non-renderable content for storage in an electronic reader device. The user of the electronic reader device may be notified of an availability of the stored content via an interface. The user may select the renderable content via the interface so that it may be immediately rendered on the display. The user may select and optionally electronically purchase the non-renderable content via the interface such that upon the selection or the purchase of the non-renderable content may also be immediately displayed.

In a further illustrative embodiment, the electronic reader device dynamically detects user preferences and habits. The electronic reader device may internally have a set of rules to determine a time or a time period when the electronic reader device should optimally connect to the server to obtain content. Such a time period may be selected, e.g., based on when the electronic reader is connected to AC power, times of when the electronic reader has a quality signal from the network, location of the electronic reader device, habits of the user of the electronic reader device, time periods of low electronic reader device activity or time periods of reduced content delivery costs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
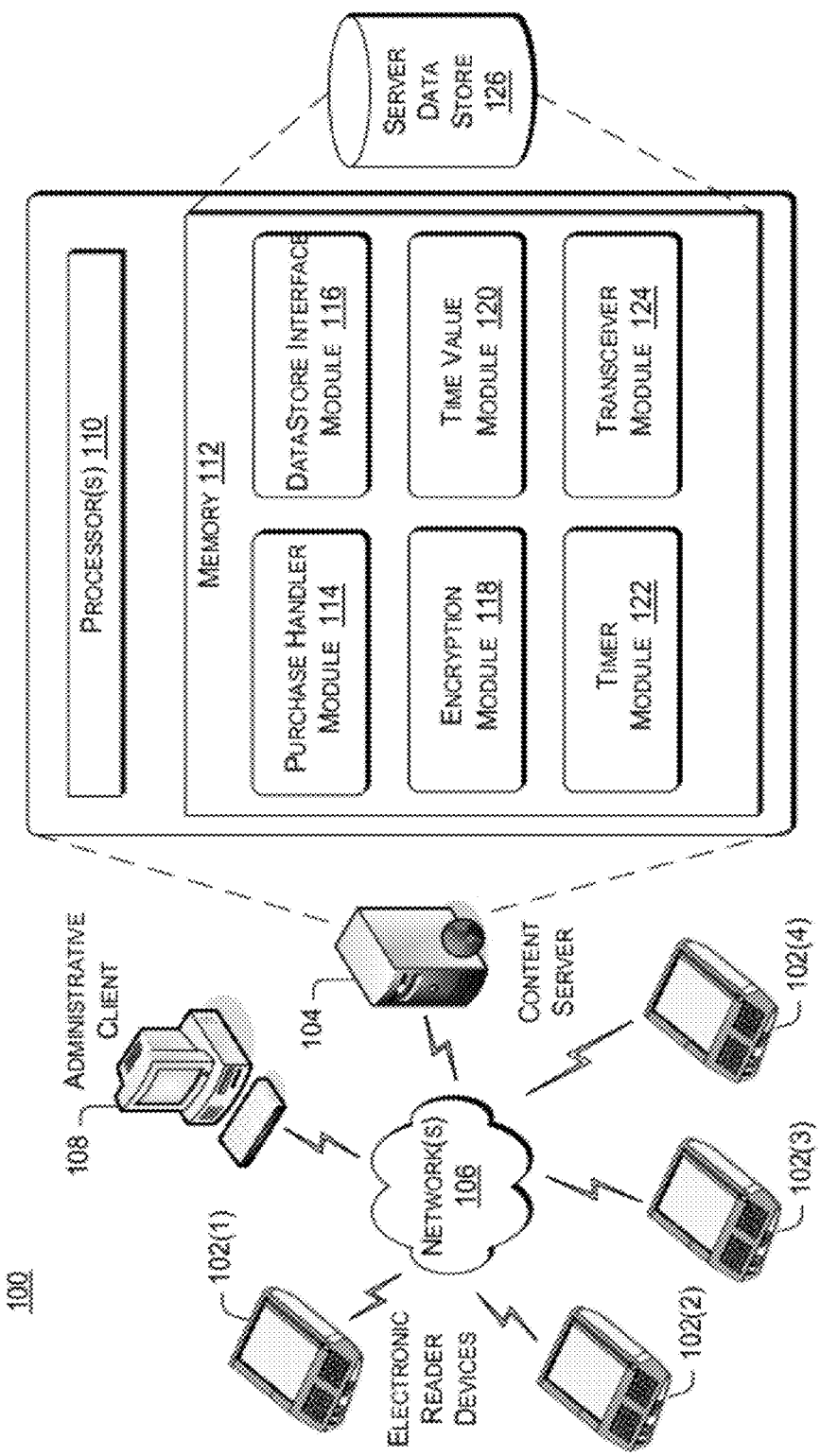
FIG. 1 depicts an example architecture in which electronic reader devices and a content server providing content may be implemented. The architecture includes multiple electronic reader devices coupled via a network to a content server.

This disclosure is directed to an illustrative electronic reader device to which content may be downloaded for display, as well as related systems and methods for managing such download. The download management systems and methods may determine what content should be transferred and a variety of time values indicating when the content should be transferred to the electronic reader device from a content server. In some embodiments, user preferences may be used to determine what content should be transferred. Such user preferences are entered by the user on a graphical interface on the reader device or are entered by an administrator into a data store coupled with the content server. From the user preferences, the content server may determine the content to be delivered to the electronic reader device. The content server may transfer some content, e.g. content available for purchase, in encrypted form to the electronic reader device.

In other embodiments, the electronic reader device may determine the time values based on the habits of a user of the electronic reader device, its own status or a status of a network connecting it to the content server. In one embodiment, the content may be transferred during time periods of low activity, when a close range exists between the device and a content transmission node or when the cost of transmission of content over the network is reduced. The user of the electronic reader device may then receive the content into its memory; optionally purchase the content and in any event access the content instantly without additional content having to be downloaded from the content server. By transferring the content during off-peak times and based on what the download management system anticipates that the user would likely download, the delay perceived by the user is minimized.

These and other aspects are described below in various example implementations of an electronic reader device. The terms "book" and/or "eBook" are used synonymously and, as used herein, may include electronic or digital representations of printed works, as well as original electronic or digital content that may include text, multimedia, hypertext and/or hypermedia. Examples of eBooks and/or digital works include, but are not limited to, books, magazines, newspapers, periodicals, journals, reference materials, telephone books, textbooks, anthologies, instruction manuals, proceedings of meetings, forms, directories, maps, blogs, etc. Also, while various aspects and features are described herein as applied to an eBook or an electronic reader device, the concepts may be implemented in other electronic devices or electronic readers besides eBook reader devices including, for example, personal computers, portable computers (e.g., laptops or pocket PCs), personal digital assistants (PDAs), portable gaming devices, wireless phones, and the like.

Various examples of download management applied to an electronic reader device are described below with reference to FIGS. 1-10.

Example System Architecture

FIG. 1 depicts an example architecture of system 100 in which a content server may provide content to electronic reader devices at favorable download times so that the delay perceived by a user between selecting the content and receiving the content is reduced. In system 100, a plurality of electronic reader devices, including devices 102(1), 102(2), 102(3), and 102(4), can access a content server 104 via one or more networks 106. The one or more networks 106 are representative of any one or combination of multiple different types of networks, such as local area networks, wide area networks, global networks (e.g. the internet) cable networks, and wireless networks. Examples of wireless networks may include, but are not limited to, a Cellular network, a WiFi network, and/or a WiMax network.

System 100 also includes an administrative client 108 that can also access the content server 104. Although one content server 104 is shown, the term "server" can mean more than one server connected together with a network or a bus, and can include what is commonly referred to as a "server farm." The administrative client 108 allows the management of content that is transmitted to each of the electronic reader devices, including devices 102(1), 102(2), 102(3), and 102(4).

FIG. 1 further depicts an example implementation of certain components of a content server 104 used to provide content to a plurality of electronic reader devices 102(1-4). The content server 104 has process capabilities and memory suitable to store and execute computer-executable instructions. In this example, the content server 104 includes one or more processors 110 and memory 112. The memory 112 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 112 are modules 114-124. The modules are implemented as software, firmware or computer-executable instructions that are executed by one or more processors 110. A server data store 126 also resides in memory 112. The purchase handler module 114 is responsible for managing content requests or declinations originating from one or more electronic reader devices, including devices 102(1), 102(2), 102(3), and 102(4). Such content requests may be for purchasable content, free content or subscription based content. A data store interface module 116 is configured to access and retrieve content from the server data store 126. Moreover, the data store interface module 116 is also configured to read and write information in memory 112 associated with the content, such as profiles and preferences of users who are ultimately provided with the content, respectively from and into the server data store 126. Data store interface module 116 may also be configured to read and write into memory 112 profiles of electronic reader device, such as a network status of the electronic reader device, and habits of a user of the electronic device as detected by the electronic reader device, or provided by the user, or a status of the electronic device. Those skilled in the art will recognize that the data store may also reside externally to the server 104 and may be distributed across a plurality of devices without departing from the spirit and scope of the present disclosure.

An encryption module 118 is configured to selectively encrypt content, and in certain embodiments compress content, store the content in the server data store 126 before the content is provided to the one or more electronic reader devices. The encryption module 118 may be used to encrypt content that is not freely available so that users must provide monetary or other value in exchange for receiving the content. Encryption can be done using private key/public key pairs or using any generally known encryption algorithm.

A time value module 120 stores the times or time periods at which content is to be transmitted to each of the electronic reader devices, including devices 102(1), 102(2), 102(3), and 102(4). A timer module 122 may maintain the internal time of the content server 104, as well as track the local time of each electronic reader device. The timer module 122 may independently activate the transceiver module 124 to transmit content to each of the electronic reader devices, including devices 102(1), 102(2), 102(3), and 102(4). Alternatively, the timer module 122 may work in conjunction with the time value module 120 to initiate transceiver module 124, so that content is only transmitted to each of the electronic reader devices at times or time periods designated by the time value module 120. In another implementation, the time module 122 may both function independently and in conjunction with the time value module 120.

The time value module 120 may store time values such as preferred time or time period for the delivery of content from a content server 104 to an electronic reader device 102 corresponding to a time period when activity on the network 106 is low. These periods generally occur at off-peak times, such as at night and/or weekends and/or holidays. Another preferred time is when the electronic reader device is connected to AC power or when the electronic reader device has a strong network connection, e.g. the signal strength of the connection exceeds a predetermined level. In such cases battery life of the electronic reader device may be preserved while content is being delivered to the device 102. The information stored on the server data store 126 may also include transmission monetary rate data for transmission of content, so that information may be transmitted at times or time periods when the monetary cost of transmission of content is low.

A time period corresponding to a period of time when a likelihood of a user using an electronic reader device may also be stored in a time value module 120. This stored time period may allow the content server to determine when a specific eBook should be transmitted to the user's electronic reader device. For example, when the likelihood of a user using a particular electronic reader device is low, the content server 104 may determine that the eBook should not be transmitted to the electronic reader device.

Figure 2:
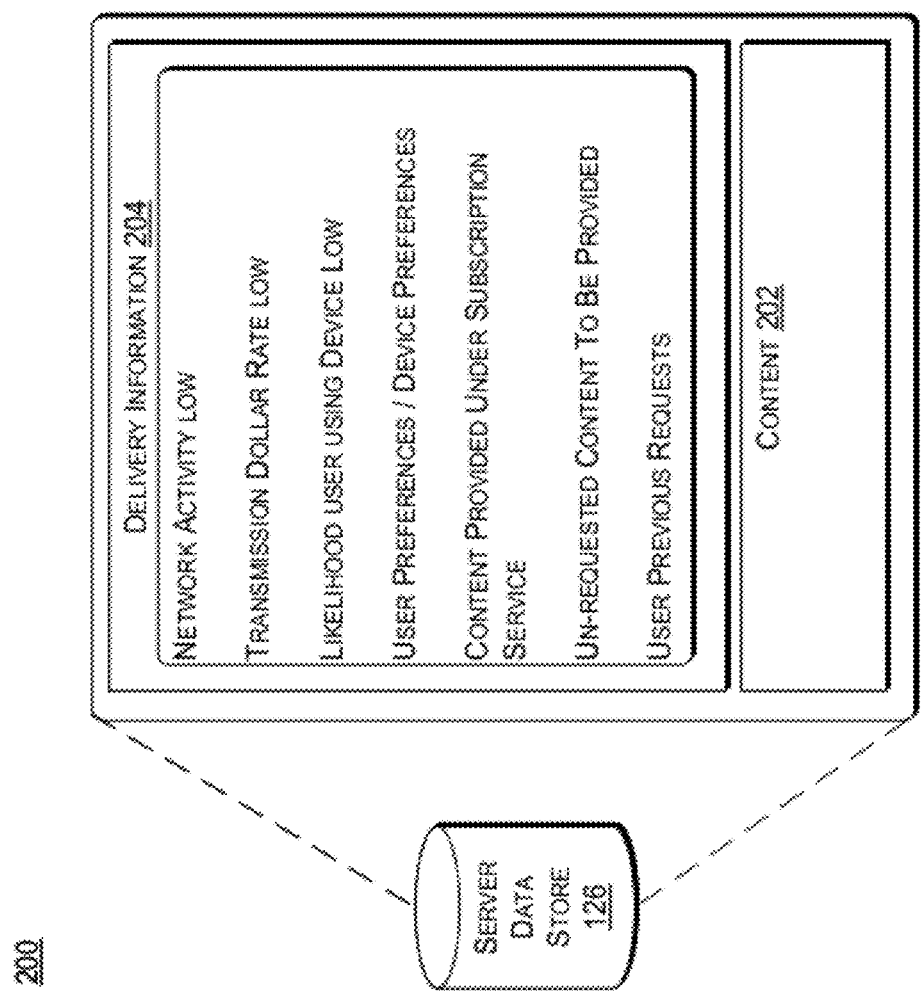
FIG. 2 is a block diagram depicting an illustrative server data store accessed by the content server shown in FIG. 1.

FIG. 2 is a block diagram 200 depicting the contents of an illustrative server data store 126 accessed by a content server 104. The server data store 126 includes content 202 and delivery information 204. Content 202 may include any content in electronic or digital form. Such content 202 may be delivered to update the content server 104 via a network or may be loaded into data store 126 from an electronic media coupled with server 104. Delivery information 204 contains data that facilitates the delivery of content to electronic reader devices. Information 204 may include network activity status, monetary cost of transmission over one or more networks, user preferences (including location coordinates and zip code for the electronic reader device), rules for the electronic reader device (e.g. time periods determined by the device based on usage habits as to when to request content), electronic reader device preferences (time periods of low activity of the device as determined by the device based on usage habits) and defaults, subscription rates and plans, content costs, un-requested content to be provided, previous content requests, likelihood that a user will view a particular content, and the like. Some of this information may be used to determine preferred, and in some cases optimal, time or time periods for the delivery content, which is then also stored in server data store 126.

The size of the electronic reader device's available memory may also be stored on the content server and used to determine when certain eBooks or other content transmitted to the user's electronic reader device should be deleted. For example, if the size of the electronic reader device's available memory is limited or close to capacity, the server may provide an indication to the electronic reader device that a previously transmitted eBook should be deleted for other more suitable content. In some embodiments content which has been downloaded but not yet purchased is deleted.

The user preferences may be stored in server data store 126 and may be used to determine the content that should be transmitted to the user's electronic reader device. Server data store 126 may also include a list of content that is to be provided to users pursuant to a user subscription. Users' previous requests or purchase histories for particular content, such as by content from a particular publisher and/or genre and/or author, may also be stored in the server data store 126 and may be accessed by content server 104 to allow the content server 104 to predict content that may be desirable to each of the users. Users may go to a web site hosted by or coupled with content server 104 and purchase eBooks or other content for delivery to the electronic reader device. The purchase of such content may be noted in an account record of a user in data store 126 and such content may be subsequently delivered to electronic reader device using the techniques described herein.

Content server 104 may read data store 126 and preemptively deliver content to at least some users' electronic reader devices without being requested by the users. By preemptively delivering content, the perceived delay to the user when requesting the content is reduced. Although some of the information that is stored in the server data store 126 has been illustrated and discussed in FIG. 2, one skilled in the art will readily appreciate that there are other useful information related to both content and the user, that may be stored in the server data store to facilitate the transmission of the content, including eBooks, from the content server 104 to electronic reader devices.

Figure 3:
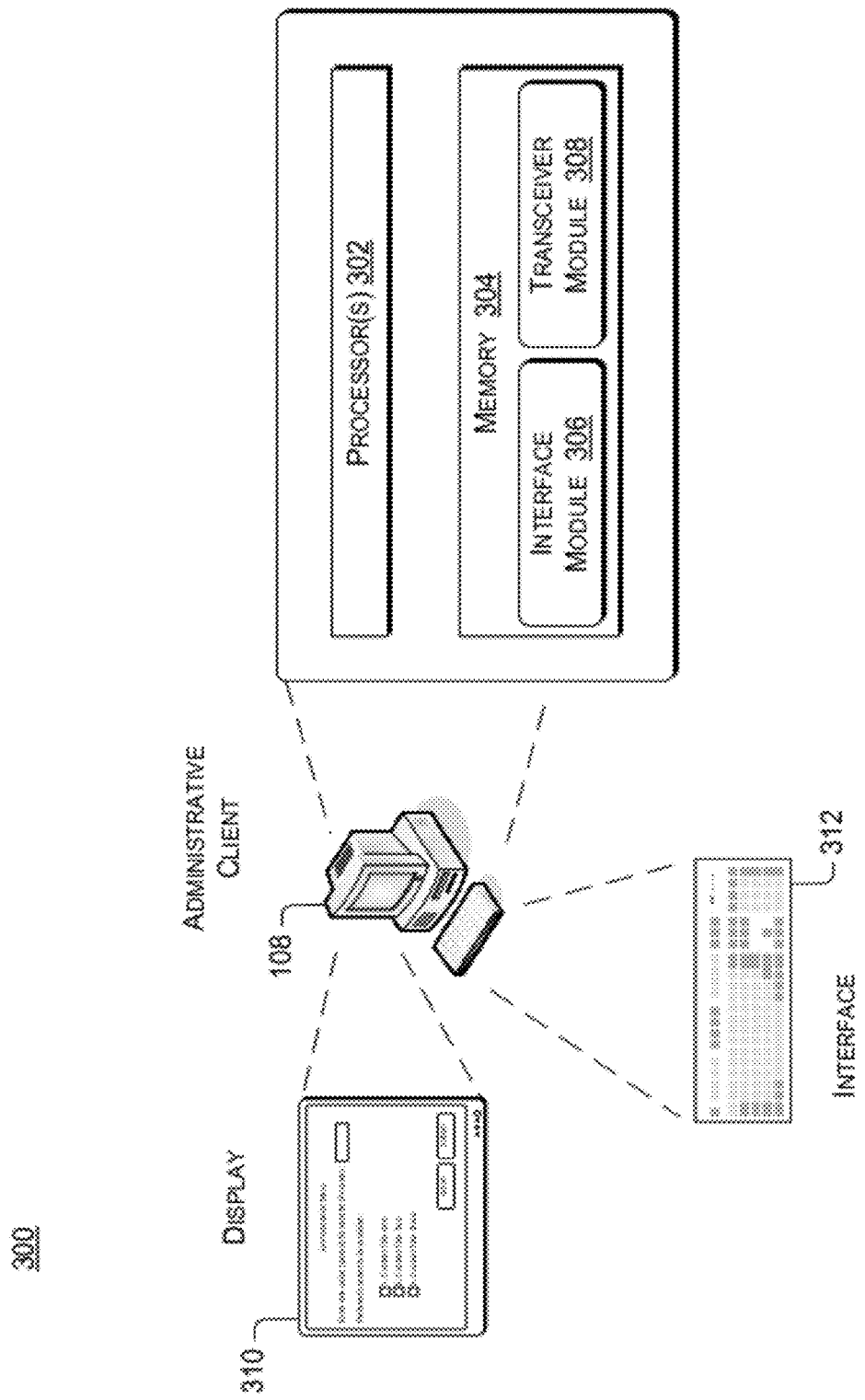
FIG. 3 is a block diagram depicting selected illustrative modules implemented by an administrative client shown in FIG. 1.

FIG. 3 is a block diagram 300 depicting selected modules in an embodiment of an administrative client 108 coupled with a content server 104 shown in FIG. 1. The administrative client 108 has process capabilities and memory suitable to store and execute computer-executable instructions. In this example, the administrative client 108 includes one or more processors 302 and memory 304. The memory 304 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

As illustrated in FIG. 3, an interface module 306 and a transceiver module 308, residing in memory 304, are implemented as software or computer-executable instructions that are executed by one or more processors 302. The interface module may present data to an administrator on a display 310, and receive input from an administrator on a user interface 312. The user interface 312 may include any input mechanism that enables the administrative client 108 to receive input from the user, and to provide output to the user. The user interface 312 may include, but is not limited to, combinations of one or more of keyboards, keypads, mouse devices, touch screens, microphones, speech recognition packages, and other suitable devices. Moreover, the transceiver module 308 serves to communicate with the content server 104. The transceiver module 308 enables the transmission of data from the administrative client 108 to the content server 104, and the reception of data from the content server 104 to the administrative client 108.

Figure 4:
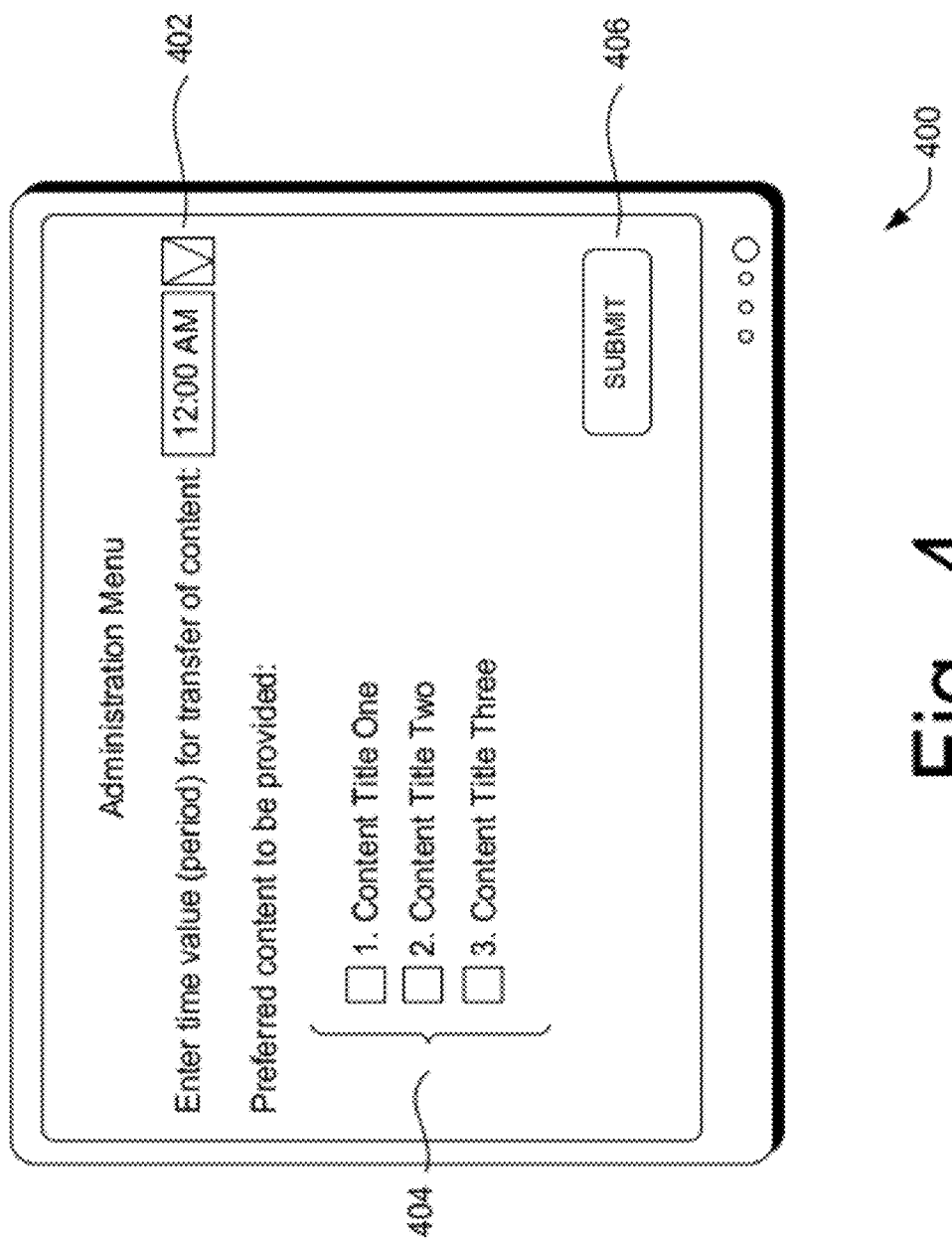
FIG. 4 depicts an illustrative embodiment of a display interface generated on the administrative client shown in FIG. 3.

FIG. 4 depicts a screen rendering of an illustrative embodiment of a display interface 400 on an administrative client 108, coupled with a content server 104 (FIG. 1) used to manage an electronic reader device 102. Although an administrative client 108 describes managing the electronic reader device 102, in other embodiments, electronic reader device 102 may manage itself based on rules stored in the device 102, such as rules that govern the time of when content should be requested from the server. Such rules may be set based on habits of the user of the electronic reader device, and in some embodiments such rules may be modified using intelligent software in the electronic reader device. Further details of the implementation of these rules are explained herein in the description of FIG. 10. In another embodiment, electronic reader device 102 may be managed via a website or a third party server.

The interface 400 is typically generated on the display 310 of the administrative client 108, as discussed in FIG. 3. This example implementation of display interface 400 has a pull down selection menu 402 that enables an administrator to choose a favorable time for the transfer of content to one or more electronic reader devices, such as devices 102(1), 102(2), 102(3), and 102(4). (FIG. 1). Such time may be determined based on patterns of request for content times of one or more users or times when the cost to operate the network is reduced. The display interface 400 may also have a plurality of selection boxes 404 that enables the administrator to select one or more titles to be provided to one or more electronic reader devices from the content server 104. Once the administrator has selected the one or more titles, the administrator may also use a submit icon 406, or another affirmation interface, to provide the settings to the content server 104 via the administrative client 108.

However, one of ordinarily skilled in the art will readily appreciate that the content server 104 and the administrative client 108 may be configured so that a variety of other display interfaces may be presented on display 310 in other implementations. These additional implementations may enable an administrator to control and manipulate other time or delivery variables associated with the transmission of content, as well as monitor the content server 104 and one or more electronic reader devices. Examples of such interfaces may include content genre, author, advertisements, multimedia title, and publisher.

In one embodiment, for example, the user of administrator client 108 may also be able to enter location data regarding the electronic reader devices, so that only electronic reader devices within a certain locale will be delivered certain content. This feature may be useful when determining what language the content server may make available to specific electronic reader devices. For example, information may be entered by the user of the administrator client 108 so that the content server 104 will only deliver content in English to electronic reader devices in the United States, while enabling content to be delivered to electronic reader devices in Canada to be delivered both in English and French.

Figure 5:
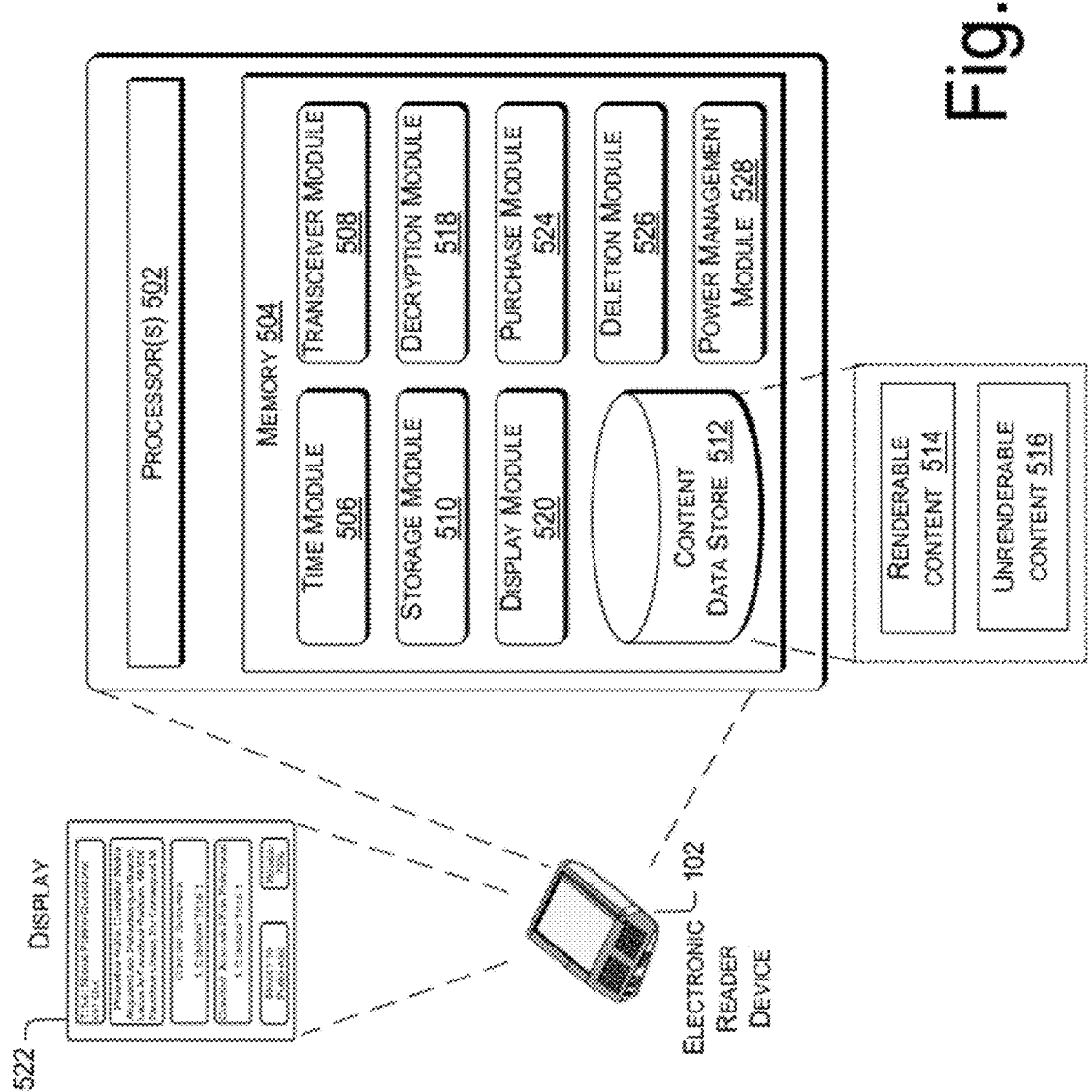
FIG. 5 is a block diagram depicting selected illustrative modules implemented by an electronic reader device shown in FIG. 1.

Illustrated in FIG. 5 is an example implementation of certain components of an electronic reader device 102 used to display content received from the content server 104. The electronic reader device 102 has process capabilities and memory suitable to store and execute computer-executable instructions. In this example, the electronic reader device 102 includes one or more processors 502 and memory 504. The memory 504 may include volatile and nonvolatile memory, removable and non-removable media implemented in any method or technology for storage of information, such as computer-readable instructions, data structures, program modules or other data. Such memory may include, but is not limited to, RAM, ROM, EEPROM, flash memory or other memory technology suitable for implementation in a portable device.

Modules 506-510 and 518-528 may be stored in memory 504. Modules 506-510 and 518-528 may be implemented as software or computer-executable instructions that are executed by one or more processors 502. The time module 506 contains a time of day indication, and may be used to determine the time at the location of the electronic reader device 102. In one embodiment, time module 506 may also be coupled with a global positioning system device (not shown) that indicates the present location coordinates of the electronic reader device. Such location could be used to determine the time zone of the user, so that as the user of the electronic device moves from time zone to time zone, the content server could deliver content to the user at the same time every day. Time module 506 may also include intelligent software that determines habits of the user of the electronic reader device 102.

For example time module 506 may, in one embodiment, have a set of rules as to what content to update and when to update the content. Time module 506 may provide a user interface to enable the user of the electronic device to set a preferred time to connect to the server 104, but the time module 506 may also include intelligent device rules which would set the preferred time to request and retrieve content. Examples of these rules would include a rule that determines when the user reads his electronic newspaper, i.e. every morning at 6 am, so that the electronic reader device would automatically connect to the server 104 and request content no later than 5:30 to obtain an updated electronic newspaper.

In another example, the time module 506 would determine how long of period has passed since the electronic reader device 102 has been used. If the device 102, for example, has not been used in several days or weeks, a rule would be set to stop the electronic device reader 102 from requesting content from the server 104. In another embodiment, the time module 506 could determine that content (certain feeds or papers) that the user subscribes to is not accessed often, for example, a frequency of less than once every few days, less than once a week, or less than once a month. The rule would be set to not allow the electronic reader device 102 to request a download of content from those particular feeds or for that particular type of content. Using these rules with intelligent software would enable the device 102 to manage different types of content and download times without having the user of electronic device 102 manually create rules.

The transceiver module 508 is employed to connect to one or more networks 106, and request and receive content transmitted by the content server 104. Transceiver module 508 may also transmit various device preferences to server 104. Time module 506 may supply the location coordinates from the GPS to storage module 510 for storage in data store 512.

The storage module 510 may be configured to transfer the content to the content data store 512. The content received by the transceiver module 508 and stored in the content data store 512 may be in the form of renderable content 514 and non-renderable content 516. In one embodiment, both non-renderable content and renderable content may be in a compressed format. Renderable content 514 may also be unencrypted and may be readily displayed by the display module 520 on a display 522. Non-renderable content 516, however, may be encrypted and may be decrypted (and decompressed) by the decryption module 518 using a content server supplied decryption key. Upon decryption, the non-renderable content 516 becomes renderable content and may be displayed by the display module 520 on the display 522. Generally, renderable content 514 may be content that is freely available to the user or content that the user has already purchased, or content in which the user has otherwise accepted rights. In some embodiments, the content is purchased via a web site, or purchased pursuant to a subscription service. On the other hand, non-renderable content 516 may be content that has been placed on the electronic reader device 102 by the content server 104, but has not yet been purchased or otherwise acquired by the user.

Purchase module 524 may enable the user of the electronic reader device 102 to buy content. The user of electronic reader device 102 may electronically purchase content that is stored in the content server 104 or may purchase non-renderable content 516 that has been stored in the content data store 512. A purchase may be completed by an electronic reader device 102 sending a purchase request to the content server 104, and the content server 104 sending a purchase acknowledgement to electronic reader device 102. Once a purchase is completed by a user using the purchase module 524, a decryption key may be supplied from the content server 104 to the decryption module 518 to decrypt the non-renderable content 516 into renderable content 514 for presentation by the display module 520 on the display 522. Such presentation could be provided instantly when the user purchases the content thereby reducing or eliminating any perceived delays by the user when the user selects the content.

The deletion module 526 may enable the content server 104 to remotely delete content that has not been purchased or other unnecessary content to free up space in the content data store 512 so that additional content may be transmitted to the electronic reader device 102 and stored in the content data store 512. In some implementations, the deletion module 526 also enables the user to delete undesired non-renderable content. Such non-renderable content may be deleted automatically from the memory of the electronic reader device 102 in situations described further herein.

A power management module 528 may also be stored in memory 504. Power management module 528 may monitor the signal quality of transceiver hardware (not shown) coupled with electronic reader device 102. Power management module 528 may determine when to request that content be sent or not sent from the server 104 based on a quality of a connection between the electronic reader device 102 and the server 104. Power management module 528 could also determine whether or not the electronic reader device 102 was operating on AC or battery power.

In the event of a wireless network connection being used for transmission of content, power management module 528 may monitor and determine the amount of transmission power required for the transceiver hardware to send and receive content. For example if the distance between the electronic reader device 102 and an antenna from which the content originates was great and the electronic reader device 102 was operating on battery power, the power management module 526 would determine that more power is required from the electronic reader device 102 to receive content. Such determination could also be made by monitoring the signal quality of the network. Thus, electronic reader device 102 may provide an indication not to request and subsequently download content from the server 104 until such distance is limited, network quality improves, or until electronic reader device 102 begins operating on AC power. Thus, by monitoring the transmission power, battery life of the electronic reader device 102 could be increased. By anticipating the content the user of the electronic reader device will request from the server, and downloading content in advance when network quality is improved or when the device is connected to AC power, the perceived delay will be decreased when the user eventually requests the content.

Figure 6A:
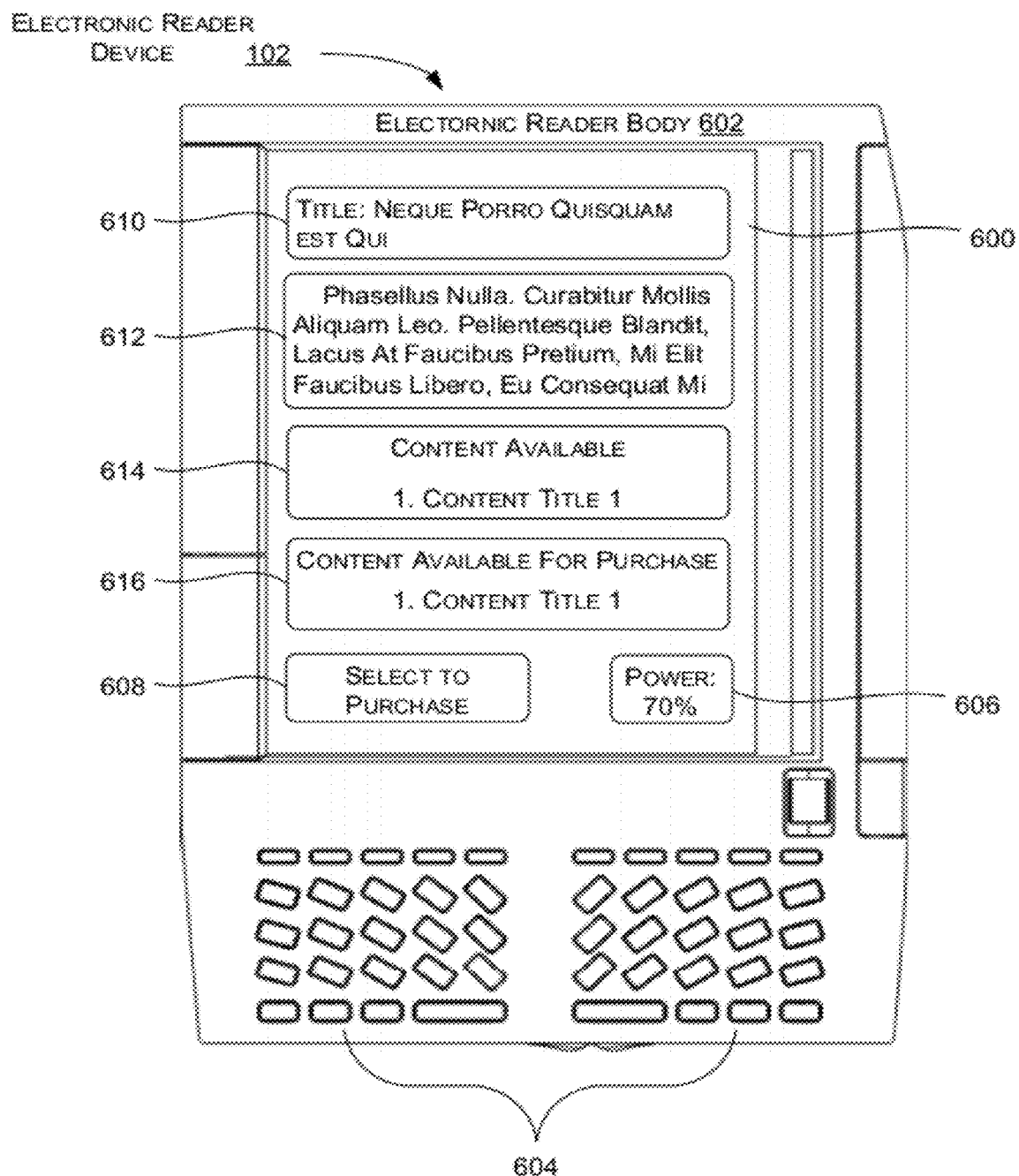
FIGS. 6a and 6b depict illustrative embodiments of a display interface generated on an electronic reader device as shown in FIG. 1.
Figure 6B:
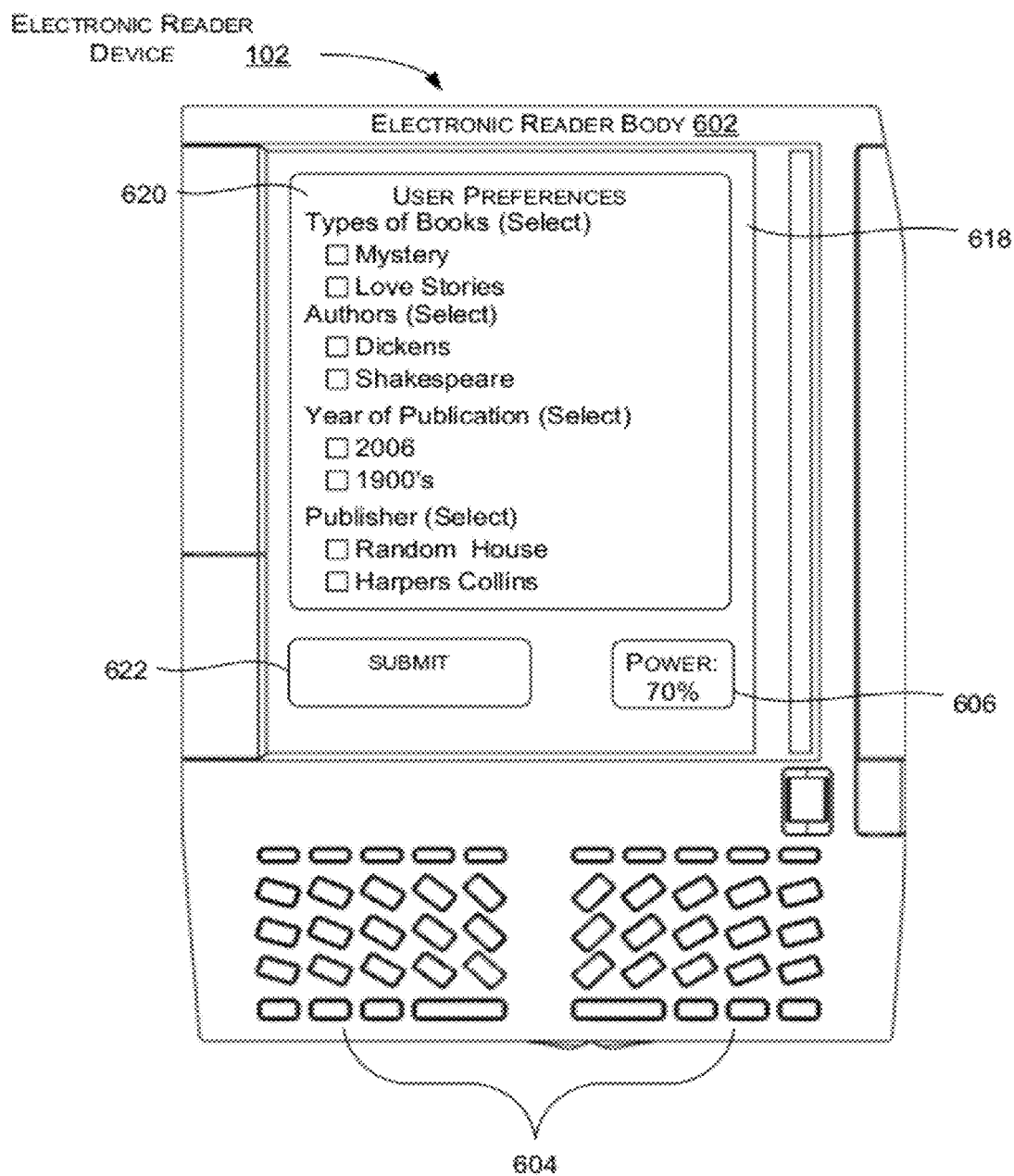

FIGS. 6a and 6b depict illustrative interfaces 600 and 618 of an electronic reader device 102. The display interfaces 600 and 618 may be housed in the body 602 of an illustrative electronic reader device 102. The body 602 of the electronic reader device 102 may also be equipped with keyboard 604 (also referred to as an input device) that enables a user to interact with the electronic reader 102. In addition, the displays 600 and 618 may be a type that both displays data and receives data inputs from a user, such as a touch screen.

FIG. 6a depicts an illustrative display that assists the user in purchasing content. Specifically, the display 600 may be configured to present the power status 606 of the electronic reader device 102, receive a user input through the manipulation of designated portions, including areas 608-614 of the display 600, as well as to present content and purchase information. The display 600 may be configured to present content information, such as the content of an eBook, in title area 610 and content area 612. The display 600 may also be configured to present a list of content that is available on the electronic reader device 102 in an available content area 614. Moreover, the display 600 may be further configured to present a list of content that may be purchased by a user of the electronic reader device 102 in content available for purchase area 616. Such content available for purchase may be provided by the content server 104 or by any web site that delivers content. Content area 612 may also present previously purchased content, content provided pursuant to a subscription feed, content stored in the memory of electronic reader device 102 or any content provided by a web site or the content server (whether such content is purchased or freely available).

In the illustrative implementation, the lists of content available to be presented and content available for purchase are presented, according to title in areas 614 and 616. However, one skilled in the art will readily appreciate that these lists of content may be presented according to other organization schemes, such as by genre, author, subject, publication year or publisher. Once a user of electronic reader device 102 has decided on a particular content to purchase or select from area 616, the user may select and optionally purchase content either using the user interface 604 or the manipulation of icons on designated areas of the screen, including area 608.

Moreover, FIG. 6b depicts an electronic reader device 102 with a same display 618 that allows a user to input user preferences for content to be received by electronic reader device 102. The user preferences may then be transmitted to the content server 104 by the electronic reader device 102. Specifically, the display 618 may be configured to present power status 606 of the electronic reader device 102. More importantly, the display 618 may also be configured to show one or more preference selection lists 620. In the illustrative implementation, since the display 618 is capable of receiving user input, the user may have the ability to use either the keyboard 604, or one or more designated areas of display 618, including area 622 to input user preferences for content. As illustrated in FIG. 6b, sample user preferences may include, but are not limited to, preferences for particular types of books, particular authors, particular years of publication, and particular publishers. One ordinarily skilled in the art will readily appreciate that the display 618 may also display other user preference categories that enable a user to input the user's particular interest in certain content.

Furthermore, in another embodiment, electronic reader device 102 may intelligently and dynamically determine the habits of its user. Also electronic reader device 102 may provide an indication of these habits to the server 104 or request that content be downloaded at preferred times as determined by these habits. For example, if the user reads his paper with the electronic reader device every morning at 6 am, the electronic reader device could connect to the server no later than 5:30 am to obtain/download the content. Such content could be downloaded while the display of the electronic reader device is turned off.

Illustrative Processes

FIGS. 7-10b depict illustrative processes involved in the transfer of content from a content server to an electronic reader device. Each process is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the system 100 of FIG. 1, although it may be implemented in other system architectures.

Figure 7:
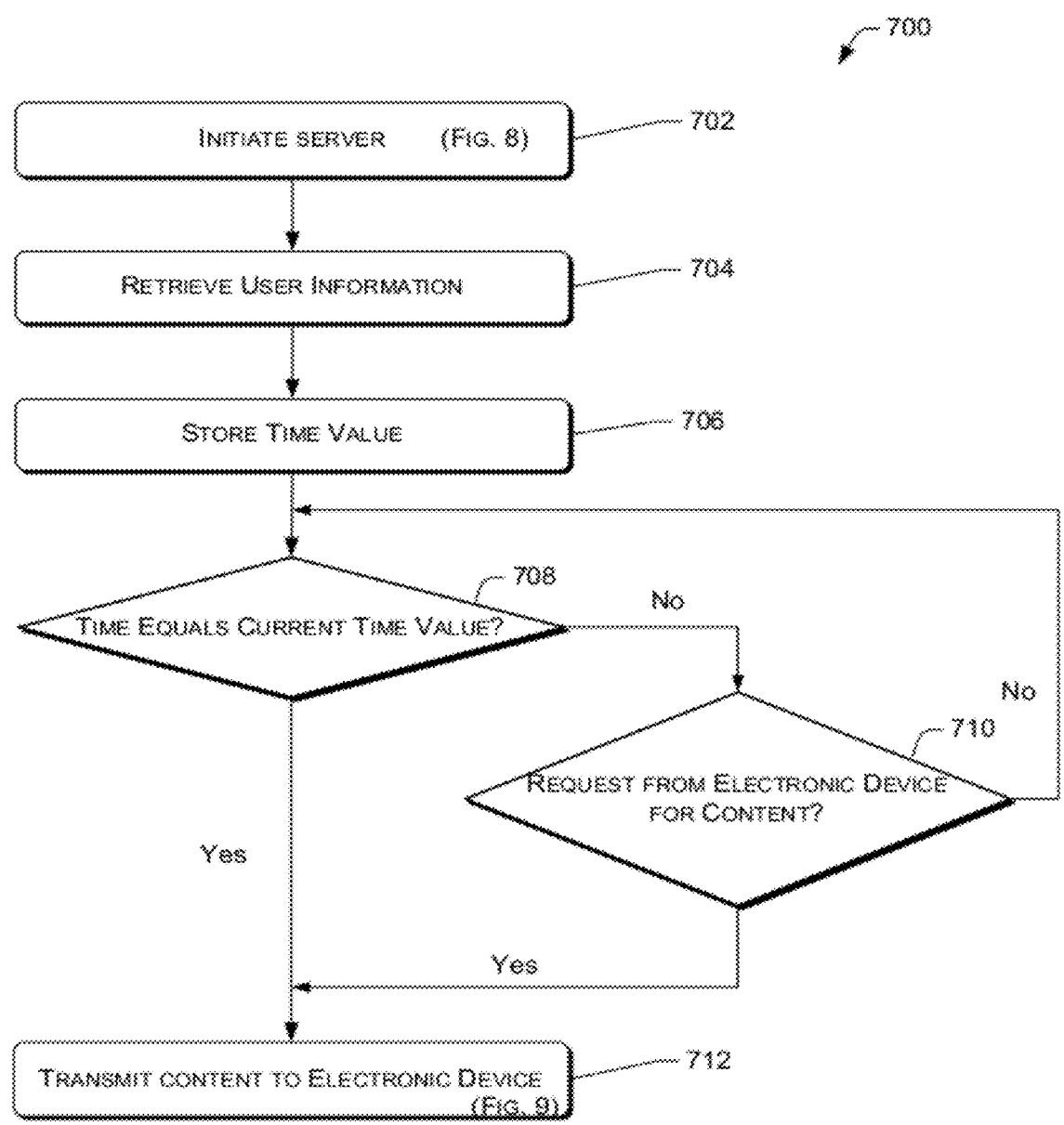
FIG. 7 depicts a flow diagram of an illustrative process for providing content from a content server to an electronic reader device.

FIG. 7 depicts a flow diagram of an illustrative process 700 for providing content 202 from a content server 104 to an electronic reader device 102. At block 702, a content server 104 may be initiated to obtain information from each electronic reader device 102 and/or administrator client 108 in preparation for providing content 202. Such initiation is further illustrated in FIG. 8 discussed in more detail below. At block 704, content server 104 retrieves user information from the information 204 portion of data store 126, examples of user information may include user preferences, electronic reader device preferences, user habits, user purchase history and previous user requests for content.

In another embodiment, such electronic reader device preferences and user habits (as well as other information pertaining to the user of the electronic reader device 102) may be obtained directly from device 102. Such habits may include the time the user has previously viewed a particular type of content and the author/genre/publisher of the previously viewed content. The retrieval of user information 204 enables the server 104 to identify the most appropriate content for transmission to the electronic reader device 102. At block 704, the content server 104 reads a time value from memory 112 that indicates when to transmit the content 202 from the server to the electronic reader device 102. Specifically, the time value may be obtained using the time value module 120, and stored as information 204 of the server data store 126. The content server 104 may access information 204 using the data store interference module 116.

Retrieving user information (in block 704) may be carried out at a time in advance of the time indicated by the stored time value so that content 202 may be transmitted to the electronic reader device 102 at the most appropriate time. In one implementation, with reference to FIG. 2, the time value stored in memory 112 may be optimized so that the transmission can be efficiently and cost-effectively carried out. This may include taking into consideration the amount of activity on one or more networks 106 connecting the content server 104 to the electronic reader device 102, the monetary cost of the transmission, the time when the electronic reader device 102 has AC power, the time when the electronic reader device 102 has a strong network connection, and the time when the likelihood of the user using the electronic reader device 102 is low. However, one ordinarily skilled in the art will readily appreciate that in additional implementations, other factors that affect the efficiency and the cost of transmission may also be considered. Moreover, the time value may be set manually by an administrator, or it may be set automatically by a software algorithm running on server 104 or electronic device reader 102.

In block 706, the time value indicating when content is to be transferred to the electronic reader device is stored in memory 112. At decision block 708, the content server 104 compares the stored time value from block 706 with the current time, which may be obtained from timer module 122. If the stored time value equals the current time, then the content server 104 transmits the content 202 to the electronic reader device at block 712. Details of block 712 are described in connection with FIG. 9.

However, if the content server 104 compares the stored time value from block 706 with the current time and determines that they do not match, the process then proceeds to decision block 710. At decision block 710, the content server 104 determines whether there is a request from content 202 for the electronic reader device 102. If there is no request for content 202 from the electronic reader device 102, the process loops back to block 708. However, if the content server 104 determines that there is a request for content 202 from the electronic reader device 102, then the process proceeds to block 712, where the content server 104 transmits content 202 to the electronic reader device 102 using the transceiver module 124.

The electronic reader device may receive the content during a period of inactivity of the reader device. Subsequently when the user of the reader device accesses the reader device the content is already stored in memory of the device. Thus the user perceives that the content is provided instantly without any delay.

In another embodiment content 202 may be transmitted after the content server 104 provides an indication to electronic reader device 102 to start receiving content. Specifically, content 202 may be provided after content server 104 sends an indication to the electronic reader device 102 that the content 202 is available, and that the electronic reader device 102 may request the content. The electronic reader device 102, may then request the content be provided based on viewing habits of a particular type of content, or at a favorable time or during a favorable time period as described in FIG. 5. For example, the electronic reader device may determine that the user needs to receive a newspaper before a certain time of day, the reader device 102 automatically signals the server 104 to send the content in a low power state, such as when the display is turned off. Such content could then automatically be displayed when the electronic reader device 102 and its display is turned on.

Figure 8:
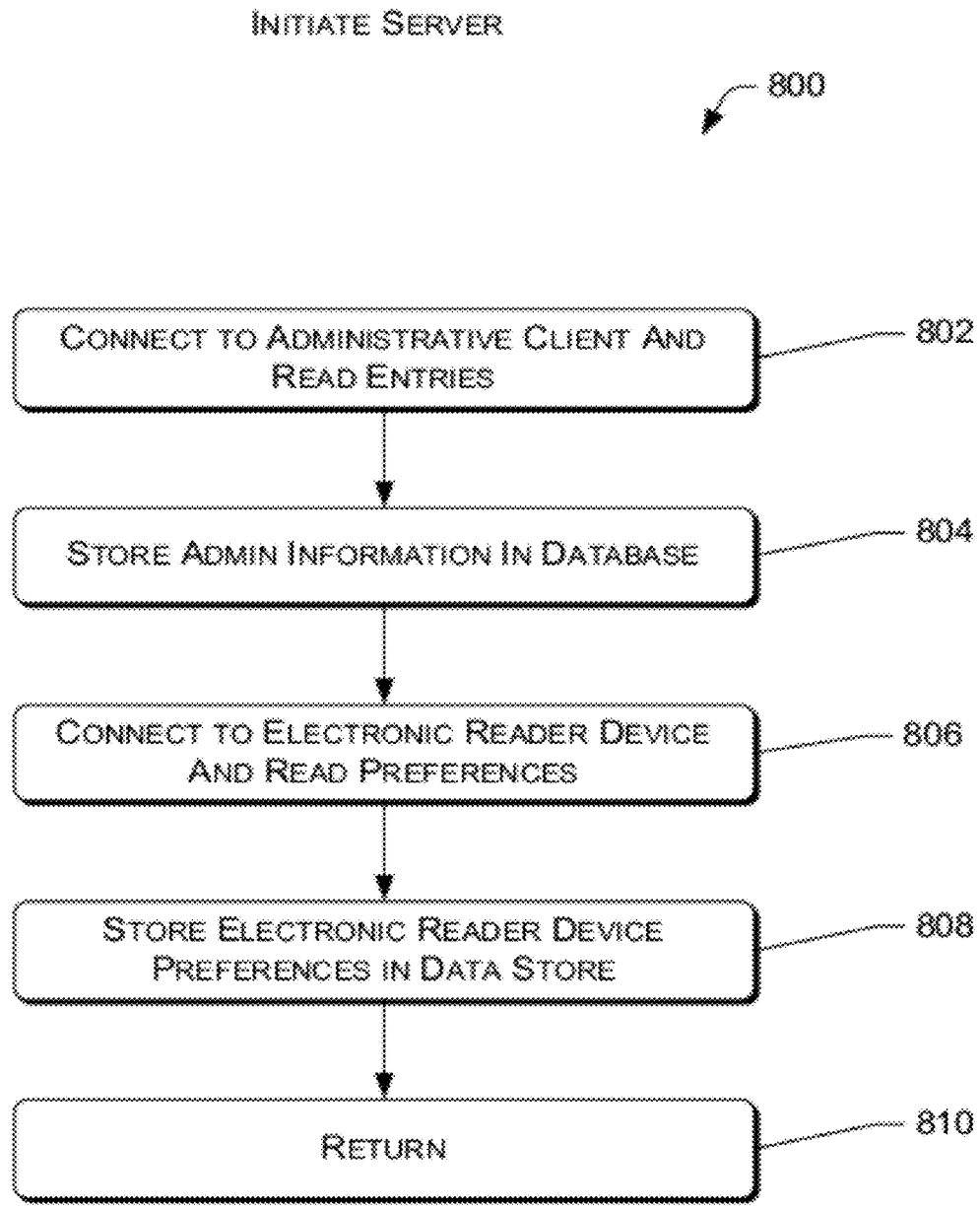
FIG. 8 depicts a flow diagram of an illustrative process for initiating a content server to provide content to the electronic reader device.

FIG. 8 depicts a flow diagram of an illustrative process 800 for initiating a content server 104 to provide content 202 from the content server 104 to an electronic reader device 102. Process 800 further depicts block 702 of illustrative process 700, as shown in FIG. 7. At block 802, the content server 104 connects with the administrative client 108 and obtains administrative entries that include time to transmit content, user preferred content, services subscribed to by the user, as well as any information indicating when to delete content using the transceiver module 124. In another embodiment, the content server 104 may connect with a server that hosts a web site to obtain the administrative entries. At block 804, the content server 104 stores these administrative entries in a server data store 126. However, if administrative entries for the user of the electronic reader device 102 are already present, the administrative entries may be updated in data store 126.

At block 806, the content server 104 connects to the electronic reader device 102 via one or more networks 106 using the transceiver module 124 and reads the user preferences, time values, and device preferences. In one implementation, with reference FIG. 6b, the user preferences may include the type of books, the authors, the years of publication, and the preferred publishers.

At block 808, the content server 104 stores the user preferences, time values and device preferences obtained at block 806 in a server data store 126. However, if user preferences are already present in electronic reader device, the preferences may be updated using the information provided in block 806. Once the user preferences have been stored, the process returns to block 704 of the illustrative process 700.

Figure 9:
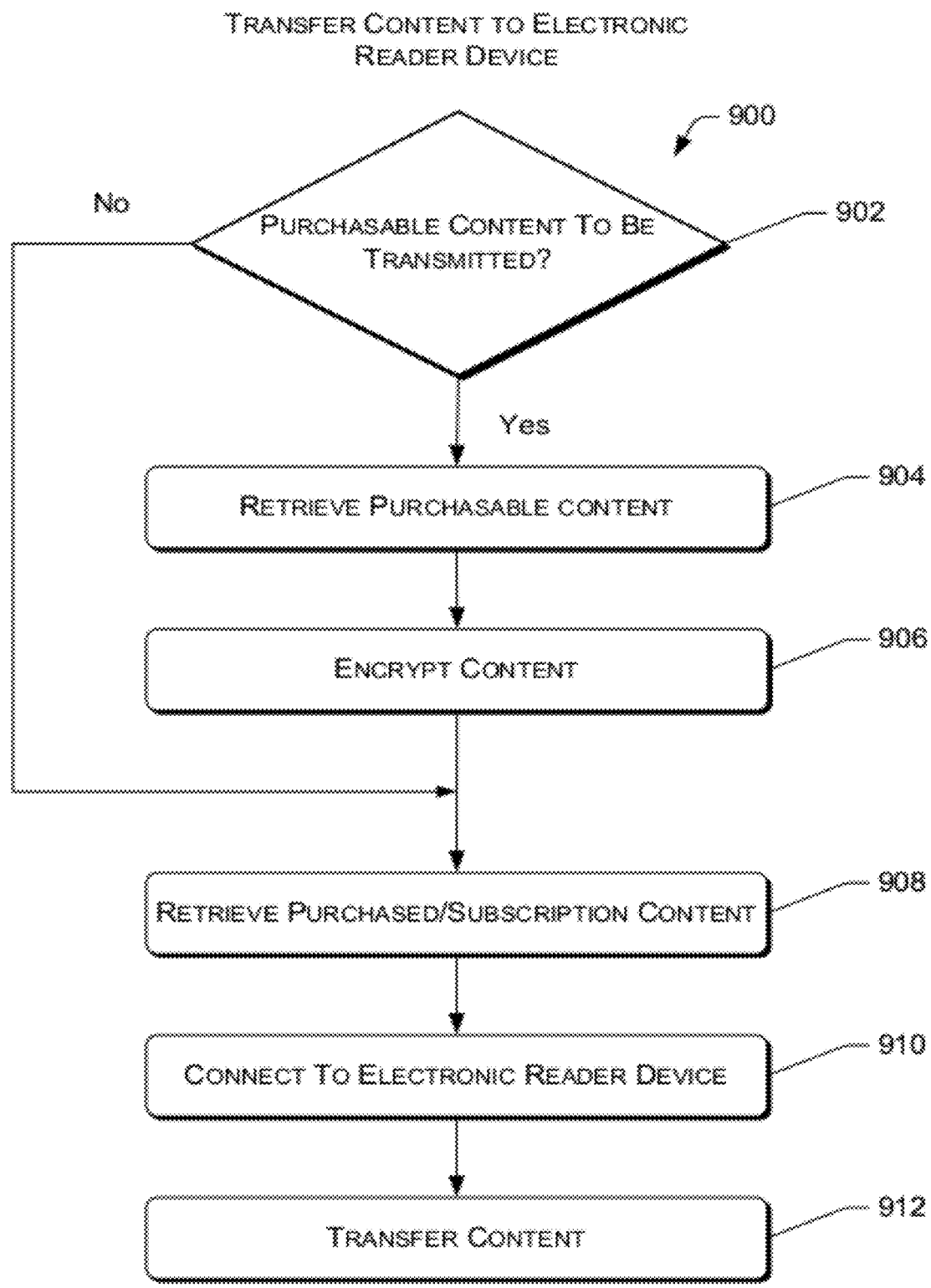
FIG. 9 depicts a flow diagram of an illustrative process for transmitting content from the content server to an electronic reader device.

FIG. 9 depicts a flow diagram of an illustrative process 900 for transmitting content 202 from the content server 104 to an electronic reader device 102 after the content server 104 is initiated. Process 900 further depicts block 712 of illustrative process 700, as shown in FIG. 7. At decision block 902, the content server 104 determines whether there is content to be transmitted to an electronic reader device 102. For the purpose of explanation, the content to be described herein is purchasable content. However, embodiments of the present invention are not limited to purchasable content but may be utilized with any type of content whether or not such content is available for purchase. For example, content may include, but is not limited to, purchasable content, content provided under a subscription, content that is provided for a limited time, content that is freely available, or content that is provided pursuant to a license. Purchasable content may include, for example, content that has not been requested by the user, but which has been determined to be of interest to the user by the content server 104 based on transmitted user preferences.

If purchasable content is present, then the process proceeds to block 904, where the content server 104 retrieves the content 202 from a server data store 126 residing in the content server 104 using the data store interface module 116. Then at block 906, in one embodiment the purchasable content may be encrypted by the encryption module 118 of content server 104 for transfer to the electronic reader device 102 at block 908. Although the content is described as being protected by encryption, in another embodiment, the purchasable content may be protected by other security techniques. Examples of such techniques include, but are not limited to, allowing limited access to the content through the use of password protection mechanisms or providing another security identification to the content server before the server allows transfer of content. Such content may also be compressed using generally known compression techniques. However, if there are no purchasable content to be transmitted, the process will proceed directly to block 908.

At block 908, content which had been purchased (by the user or a third party on behalf of the user) or which is to be provided based on a subscription service may be retrieved from the server data store 126 by the data store interface module 116. In one embodiment, such content may be retrieved directly from a third party web site that hosts content. At block 910, the content server 104 connects to the electronic reader device 102 via one or more networks 106. At block 912, the content 202 retrieved at block 908 may then be transferred from the content server 104 to the electronic reader device 102 via the transceiver module 124 immediately or during a preferred time period. In one embodiment, content server 104 may directly broadcast content 202 to the electronic device via the network 106 or any other network without connecting to reader device 102.

Figure 10A:
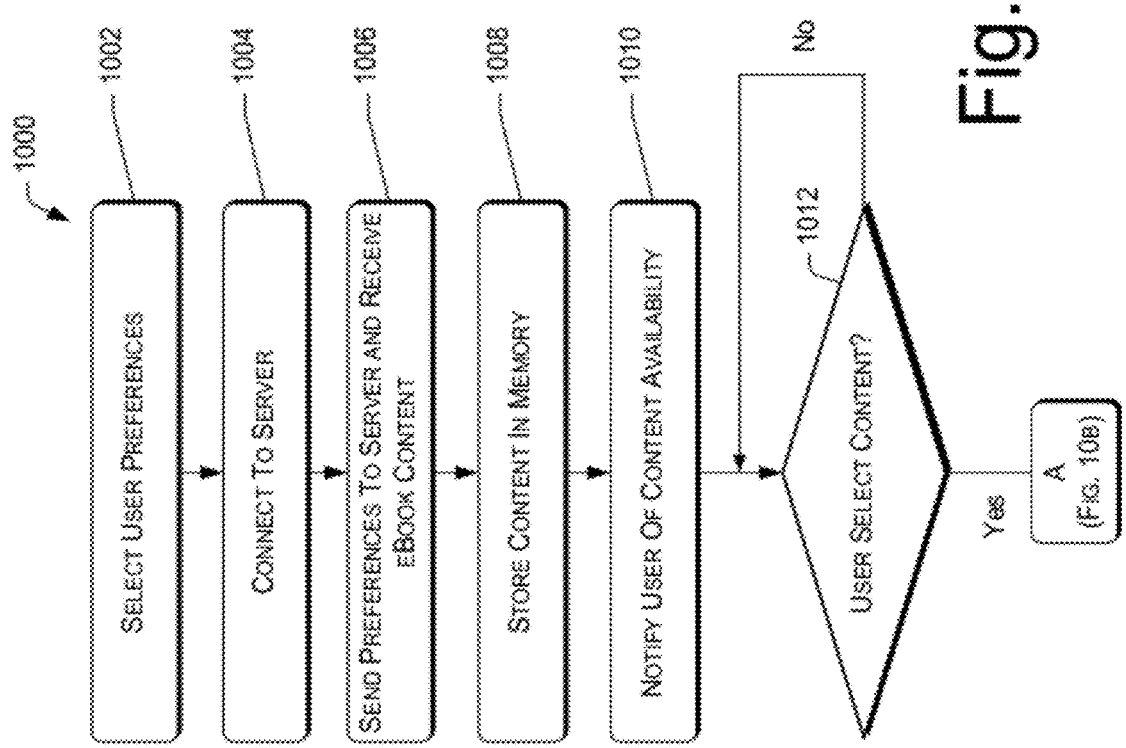
FIGS. 10a and 10b depict a flow diagram of an illustrative process 1000 for receiving content from the content server with the electronic reader device.
Figure 10B:
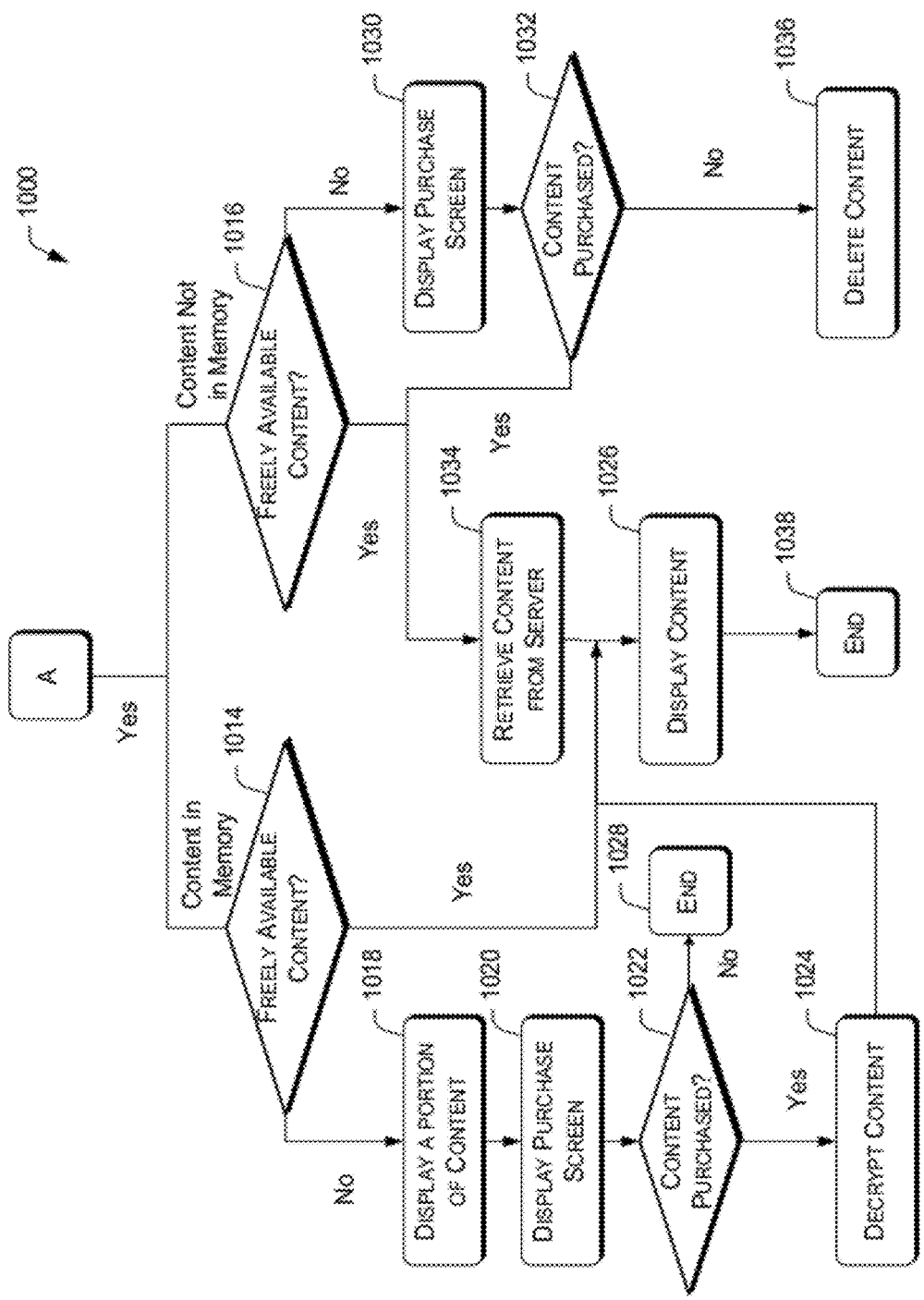

FIGS. 10a and 10b illustrate a flow diagram of an illustrative process 1000 executed on an electronic reader device 102 for receiving content from a content server 104. At block 1002, a user selects user preferences. In one implementation, with reference to FIG. 6b, the user selects and inputs the user preferences using a display 600 and interfaces 604, 618 and 620 on an electronic reader device 102. In another implementation, the device preferences are automatically determined by the electronic reader device 102.

At block 1004, the electronic reader device 102 connects to the content server 104 via one or more networks 106. The connection may be initiated by the electronic reader device 102 or by the content server 104. Such connection may be initiated pursuant to a user rule as described in FIG. 5. Such connection may also be initiated when the electronic reader device 102 is in a power down or low power state (i.e. certain components, such as the display, of the electronic reader device 102 are turned off to conserve power) as long as any electronic reader device 102 network interface hardware (not shown) and transceiver module 508 is enabled.

Once the electronic reader device 102 has connected to the content server 104 via the transceiver module 124 and transceiver module 508, the electronic reader device 102, in one implementation, may send the user preferences to the content server 104 at block 1006. The user preferences may include purchase history and the electronic reader device usage times. In another implementation, the transceiver module 508 may send a request to receive content (i.e. purchased content, subscription content, or free content). In response, the content server 104 sends electronic reader device 102 eBook content via the network 106. Such content may be directly transmitted using broadcast over a wireless or wireline channel or using unicast techniques. The eBook content is received by the electronic reader device 102 using the transceiver module 508. The received eBook content may be compressed and renderable content 514, that is, in an unsecured form ready for display on the electronic reader device or compressed and non-renderable content 516, that is, in a secured form that is encrypted or protected using other security mechanisms.

At block 1008, the electronic reader device 102 uses the storage module 510 to store the received content in the content data store 512 of its memory 504. The electronic reader device 102 notifies the user of the content availability at block 1010. In one implementation, and with reference to FIG. 6a, a user may be notified of the availability of the content by a display 600 on the electronic reader device 102 or upon display 600 being turned on. Such notification may occur by displaying an icon or symbol corresponding to the available content using display 600 or by the content being rendered and displayed automatically on the display 600.

Once the user has been notified of the availability of the content, the user has an option to select the content at decision block 1012. If the user does not select the content at decisions block 1012, the process waits for the user to select the content later. In one embodiment the process could end if the user decides not to select content, or if the content is provided automatically using a rule. However, if the user selects the content at block 1012 ("yes" to block 1012) and the content is already stored in the memory 504 of the electronic reader device 102 ("Content in Memory"), the process will then proceed to block 1014. Alternatively if the user selects the content at block 1012 and the content is not stored in the memory 504 of the electronic reader device 102 but is on a server 104 ("Content Not in Memory"), the process will proceed to block 1016.

At decision block 1014, the electronic reader device 102 determines whether the content is freely available, that is, whether the content stored in its memory 504 is available at no cost to the user. If the content stored in memory 504 of electronic reader device is not freely available, the electronic reader device 102 displays a portion of the content at 1018 using the display module 520. This allows the user to preview the content and determine whether the content is of interest. At block 1020, the electronic reader device 102 displays a purchase screen for the obtaining content. At block 1022, the electronic reader device 102 makes a determination as to whether the user would like to purchase the content by detecting an input from the purchase screen. If the user purchased the content, a purchase request is sent by the purchase module 524 to the purchase handler module 114 on content server 104. The content server 104 then supplies a decryption key to the electronic reader device 102.

At block 1024, the electronic reader device 102 then decrypts the content using decryption module 518. The electronic reader device 102 then activates display module 520 to display the decrypted content to the user on display 522 at block 1026.

If the user does not purchase the content at block 1022, the process terminates at block 1028. Returning to block 1014, if the electronic reader 102 determines that the content in its memory 504 is freely available, the process proceeds directly to block 1026, where the electronic reader device 102 displays the available content.

Similarly, at decision block 1016, the electronic reader device 102 determines whether the content stored on a content server 104 is available at no cost the user. If the content stored in the content server 104 is not freely available to the user, the electronic reader device 102 displays a purchase screen for the content at block 1030. At block 1032, the electronic reader device 102 then makes a determination as to whether the user would like to purchase the content using the purchase screen.

If the user purchased the content or if the content is freely available, the electronic reader device 102 completes the purchase in block 1034 using the purchase module 524, which interacts with the purchase handler 114 on the content server 104. The electronic reader device 102 then retrieves the content from the content server 104 at block 1034 before displaying available content at 1026 using the module 500 and display 600 as described previously. The retrieval of the purchased content is facilitated by sending information from the electronic reader device 102 to the content server 104 requesting a purchase, and then transmitting a signal from the content server 104 indicating the content that was purchased. However, if the user does not purchase the content at block 1032, the process deletes content at block 1036.

At block 1036, content may be deleted from the memory 504 of electronic reader device 102 by a deletion module 526. This deletion may occur for example, periodically, after a predetermined period of time, (e.g., daily or monthly), at a predetermine time, prior to the transfer of new content, upon a purchase of content, or upon the amount of content stored in the memory of the electronic reader devices exceeds a predetermined threshold.

Finally after displaying content in block 1026, the process may end in block 1038.

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for receiving content with an electronic device, the method comprising:
   transmitting a request to a server for previously purchased content during a predetermined time period;

receiving the previously purchased content from the server and storing at least a portion of the previously purchased content in a memory of the electronic device when a display of the electronic device is turned off; and notifying a user of the electronic device of an availability of the previously purchased content via the display by rendering the previously purchased content on the display in response to the display being turned on.

2. The method as recited in claim 1, wherein the previous purchased content has a publisher, and wherein the predetermined time period is determined based at least on one or more previous times when the user of the electronic device has displayed content from the publisher.

3. The method as recited in claim 1, wherein the previously purchased content is purchased by the user through a web site, by the user subscribing to a subscription service, or by a third party purchasing the content for the user from the web site.

4. The method as recited in claim 1, further comprising:
determining a length of time since the electronic device has been used; and
preventing the electronic device from requesting additional content if the length of time exceeds a predetermined time period.

5. The method as recited in claim 1, further comprising:
determining frequencies of previous requests for specific types of content that the user obtains through a subscription service; and
denying a new request for a specific type of content with a corresponding frequency of previous requests that is below a frequency threshold.

6. The method as recited in claim 1, wherein the electronic device is coupled with a wireless network, and wherein the predetermined time period is set to a time period in which the electronic device has a network connection with a signal strength that exceeds a predetermined strength level or to a time interval in which the electronic device receives alternating current (AC) power.

7. The method as recited in claim 1, wherein the predetermined time period is set by the electronic device based on habits of the user of the electronic device, based on preferences selected by the user, or based on a location of the electronic device.

8. A method comprising:
receiving requests for content from an electronic reader device of a user at a server, the requests being made under a subscription service;
determining frequencies of requests for specific types of content received under the subscription service; and
denying a new request for a first type of content with a first frequency of request that is below a corresponding first frequency threshold;
determining a time for transmitting a second type of content from a server to the electronic reader device via a network when a second frequency of request for the second type of content is below a corresponding second frequency threshold; and
transmitting the second type of content from the server to the electronic reader device at the time for storage and display by the electronic reader device.

9. The method as recited in claim 8, further comprising:
storing the second type of content in the electronic reader device; and
displaying the type of stored content on the electronic reader device.

10. The method as recited in claim 8, wherein the time is set by the server based on habits of the user of the electronic reader device, based on preferences selected by the user, or based on a location of the electronic reader device.

11. The method as recited in claim 8, wherein the time is set based on a time when network activity is lower than respective network activities at one or more other times, a time when a data transmission rates is below a transmission rate threshold, or a time when the likelihood of the user using the electronic reader device is below a usage threshold.

12. The method as recited in claim 8, wherein the time is set by an administrator of the server.

13. The method as recited in claim 8, wherein the time is set based on a previous time when a user of the electronic reader device has accessed content has a similarity to the second type of content.

14. The method as recited in claim 8, wherein the subscription service is between the user of the electronic reader device and an administrator client managing the server.

15. The method as recited in claim 8, wherein the second type of content has a publisher, and wherein the time is determined based on one or more previous times when a user of the electronic reader device has requested content from the publisher.

16. The method as recited in claim 8, wherein the subscription service is purchased by the user or by a third party on behalf of the user.

17. The method as recited in claim 8, wherein the second type of content is to be rendered by the electronic reader device in response to a display of the electronic reader device being turned on.

18. The method as recited in claim 8, further comprising determining a length of time since the electronic reader device has been used
preventing the server from transmitting a third type of content if the length of time exceeds a predetermined time period.

19. The method as recited in claim 8, wherein the electronic reader device is coupled with a wireless network, and wherein the time is set to a time in which the electronic reader device has a network connection with a signal strength that exceeds a predetermined strength level.

20. The method as recited in claim 8, wherein the time is set to a time when the electronic reader device is connected to alternating current (AC) power.

21. An electronic device comprising:
a display;
one or more processors;
memory storing components executable by the one or more processors, the components comprising:
a transceiver module to transmit a request to a server for content during a predetermined time period;
a storage module to store at least one portion of the content received from the server in a memory of the electronic device when the display of the electronic device is turned off; and
a display module to notify a user of the electronic device of an availability of the at least one portion of the content by rendering the at least one portion of the content on the display in response to the display being turned on.

22. The electronic device as recited in claim 21, wherein the content has a publisher, and wherein the predetermined time period is determined based at least on one or more previous times when the electronic device has displayed content from the publisher.

23. The electronic device as recited in claim 21, wherein the content is purchased by the user through a web site, by the user subscribing to a subscription service, or by a third party purchasing the content for the user from the web site.

24. The electronic device as recited in claim 21, further comprising a time module to determine a length of time since the electronic device has been used and to prevent the electronic device from requesting additional content if the length of time exceeds the predetermined time period.

25. The electronic device as recited in claim 21, further comprising a time module to determine a frequencies of previous requests for specific types of content that which the user obtains through a subscription service and to deny a new request for a type of content with a corresponding frequency of previous requests that is below a frequency threshold.

26. The electronic device as recited in claim 21, wherein the electronic device is coupled with a wireless network, and wherein the predetermined time period is set to a time period in which the electronic device has a network connection with a signal strength that exceeds a predetermined strength level.

27. The electronic device as recited in claim 21, wherein the predetermined time period is set to a time interval in which the electronic device receives alternating current (AC) power.

28. The electronic device as recited in claim 21, wherein the predetermined time period is set by the electronic device based on habits of the user of the electronic device.

29. The electronic device as recited in claim 21, wherein the electronic device is coupled with a receiver that indicates a location of the electronic device, and wherein the predetermined time period is set by the electronic device based on the location.

30. The method as recited in claim 1, wherein the previously purchased content is received from the server via a wireless network.

31. The method as recited in claim 8, further comprising transmitting an indication that indicates the time for transmitting the second type of content to the electronic reader device.

32. The electronic device as recited in claim 21, wherein the content is received from the server via a wireless network.

* * * * *